3,381,002
16β-ALKYLTHIO-17-OXO-STEROIDS
Taichiro Komeno, Osaka, and Norio Tokutake, Kobe, Japan, assignors to Shionogi & Co., Ltd., Osaka, Japan
No Drawing. Filed Mar. 1, 1963, Ser. No. 262,212
Claims priority, application Japan, Mar. 20, 1962, 37/11,348
17 Claims. (Cl. 260—239.55)

The present invention relates to steroid and production thereof. More particularly, it relates to 16β-alkylthio-17-oxo-steroid and production thereof.

The process of the present invention is substantially representable by the following scheme:

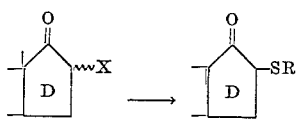

wherein X is a halogen atom (e.g chlorine, bromine, iodine); R is a lower alkyl group (e.g. methyl, ethyl, propyl, butyl, pentyl, hexyl); and the ripple mark (ξ) represents α- or β-configuration.

The process may be generally applicable to the conversion of a 16-halogeno-17-oxo-steroid into the corresponding 16β-alkylthio-17-oxo-steroid. Especially, its application to the 16-halogeno-17-oxo-steroid represented by the formula:

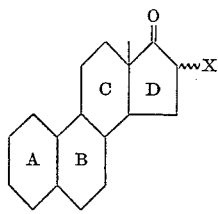

wherein X has the same significance as designated above; a substituent(s) such as hydroxyl, lower alkanoyloxy (e.g. acetyloxy, propionyloxy, butyryloxy), oxo, lower alkylenedioxy (e.g. ethylenedioxy, propylenedioxy), lower alkyl (e.g. methyl, ethyl, propyl) and lower alkoxy (e.g. methoxy, ethoxy, propoxy) and less than 4 double bond(s) can be present at any position(s) on the A-ring and the A- and B-rings, respectively; and the ripple mark (ξ) represents α- or β-configuration, gives the corresponding 16β-alkylthio-17-oxo-steroid represented by the formula:

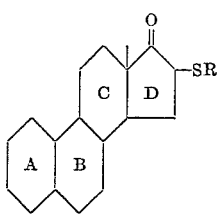

wherein R has the same significance as designated above; and a substituent(s) such as hydroxyl, lower alkanoyloxy (e.g. acetyloxy, propionyloxy, butyryloxy), oxo, lower alkylenedioxy (e.g. ethylenedioxy, propylenedioxy), lower alkyl (e.g. methyl, ethyl, propyl) and lower alkoxy (e.g. methoxy, ethoxy, propoxy) and less than 4 double bond(s) can be present at any position(s) on the A-ring and the A- and B-rings, respectively, which may possess physiological activities. Accordingly, the process of the present invention will be hereinafter illustrated taking its application to the said 16-halogeno-17-oxo-steroid (I) as an example. However, it should be understood that the scope of the present invention is not limited only to the application of the process to the said 16-halogeno-17-oxo-steroid (I).

When the process of the present invention is applied to the 16-halogeno-17-oxo-steroid (I), the conversion may be represented by the formula:

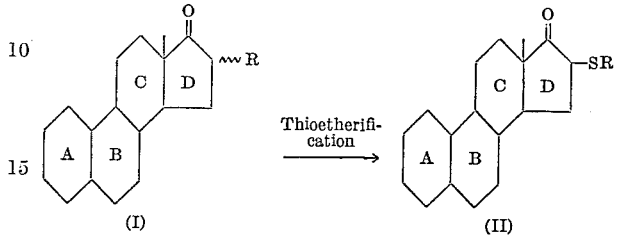

wherein X and R each has the same significance as designated above; a substituent(s) such as hydroxyl, lower alkanoyloxy (e.g. acetyloxy, propionyloxy, butyryloxy), oxo, lower alkylenedioxy (e.g. ethylenedioxy, propylenedioxy), lower alkyl (e.g. methyl, ethyl, propyl) and lower alkoxy (e.g. methoxy, ethoxy, propoxy) and less than 4 double bond(s) can be present at any position(s) on the A-ring and the A- and B-rings, respectively; and the ripple mark (ξ) represents α- or β-configuration.

The starting materials, 16-halogeno-17-oxo-steroids (I), may be exemplified as follows:

16α-chloroestrone,
16α-bromoestrone,
16β-bromoestrone,
16α-bromoestrone 3-methyl ether,
16β-bromoestrone 3-ethyl ether,
1-methyl-16α-chloroestrone,
1-methyl-16β-bromoestrone,
1-methyl-16α-bromoestrone 3-methyl ether,
4-methyl-16α-chloro-1,3,5(10)-estratrien-17-one,
4-methyl-16α-bromo-1,3,5(10)-estratrien-17-one,
3α-hydroxy-16α-chloro-5β-androstan-17-one,
3α-hydroxy-16α-bromo-5β-androstan-17-one,
3β-hydroxy-16α-bromo-5α-androstan-17-one,
3α-hydroxy-16β-bromo-5β-androstan-17-one,
3β-hydroxy-16α-bromo-5α-androstan-17-one 3-acetate,
3β-hydroxy-16α-bromo-5(6)androsten-17-one,
3β-hydroxy-16α-bromo-5(6)-androsten-17-one 3-acetate,
3α-hydroxy-16β-iodo-5(6)-androsten-17-one 3-acetate,
3β-hydroxy-16β-bromo-5(6)-androsten-17-one,
3β-hydroxy-16β-bromo-5(6)-androsten-17-one 3-acetate,
16α-chloro-5β-androstane-3,17-dione,
16α-bromo-5α-androstane-3,17-dione,
16β-bromo-5β-androstane-3,17-dione,
16α-chloro-4-androstene-3,17-dione,
16α-bromo-4-androstene-3,17-dione,
3,3-ethylenedioxy-16β-bromo-5(6)-androsten-17-one,
etc.

The said 16-halogeno-17-oxo-steroids (I) are known compounds and/or can be prepared according to per se conventional manners [e.g., Fried et al.: U.S. Patent Nos. 2,857,403 and 2,831,872; Ellis et al.: J. Chem. Soc., p. 800 (1958); Fajkos et al.: Chemical Abstracts, vol. 53, p. 4349 (1959); Johnson et al.: J. Am. Chem. Soc., vol. 79, p. 2005 (1957)].

According to the process of the present invention, the 16-halogeno-17-oxo-steroid (I) is reacted substantially with a metal lower alkylmercaptide, preferably an alkali metal lower alkylmercaptide (e.g. sodium methylmercaptide, sodium ethylmercaptide, potassium methylmercaptide, potassium ethylmercaptide), to obtain the 16β-lower alkylthio-17-oxo-steroid (II). The reaction may proceed by treating the 16-halogeno-17-oxo-steroid (I) with a metal lower alkylmercaptide in an inert organic solvent medium (e.g. acetone, dioxane, ether, tetrahydrofuran) at a temperature from room temperature (15 to 30° C.) to reflux temperature, if necessary, while stirring. Instead of the metal lower alkylmercaptide, there may be employed a combination of a lower alkylmercaptan (e.g. methylmercaptan, ethylmercaptan, propylmercaptan) and an alkali metal salt (e.g. sodium carbonate, potassium carbonate, sodium bicarbonate, potassium bicarbonate). Hereupon, the lower alkylthio group at the 16-position of the product (II) always takes β-configuration, regardless of the configuration of the halogen atom at the 16-position of the starting material (I).

The thus-produced 16β-lower alkylthio-17-oxo-steroid (II) is specifically exemplified as follows:

16β-methylthioestrone,
16β-ethylthioestrone,
16β-propylthioestrone,
16β-butylthioestrone,
16β-ethylthioestrone 3-methyl ether,
16β-ethylthioestrone 3-ethyl ether,
16β-butylthioestrone 3-methyl ether,
1-methyl-16β-ethylthioestrone,
1-methyl-16β-ethylthioestrone 3-methyl ether,
1-methyl-16β-butylthioestrone 3-methyl ether,
4-methyl-16β-methylthio-1,3,5(10)-estratrien-17-one,
4-methyl-16β-ethylthio-1,3,5(10)-estratrien-17-one,
4-methyl-16β-butylthio-1,3,5(10)-estratrien-17-one,
3α-hydroxy-16β-ethylthio-5β-androstan-17-one,
3β-hydroxy-16β-ethylthio-5α-androstan-17-one,
3β-hydroxy-16β-ethylthio-5(6)-androsten-17-one,
3α-hydroxy-16β-ethylthio-5(6)-androsten-17-one,
16β-ethylthio-5β-androstan-3,17-dione,
16β-methylthio-5α-androstan-3,17-dione,
16β-ethylthio-4-androstene-3,17-dione,
3,3-ethylenedioxy-16β-ethylthio-5(6)-androsten-17-one, etc.

These products (II) generally show various physiological activities such as pituitary gonadotrophin inhibiting activity, lipid shifting activity, uterotropic activity and anti-DOCA (desoxycorticosterine acetate) activity. For instance, 16β-ethylthioestrone 3-methyl ether showed significant pituitary gonadotrophin inhibitory activity at the oral dosage of 10 milligrams in the test using mice. Further, for instance, 3β-hydroxy-16β-ethylthio-5(6)-androsten-17-one 3-acetate inhibited the depletion of urinary volume and Na retention caused by DOCA, when subcutaneously administered to rats. The other products possess the similar physiological activities. Accordingly, they are useful as artificial hormonic agents.

The following examples set forth illustratively presently-preferred embodiments of the invention. In these examples, the abbreviations are intended to have conventional meaning: e.g. g., gram(s); mg., milligram(s); ml., millilitre(s); ° C., degrees centigrade.

Example 1

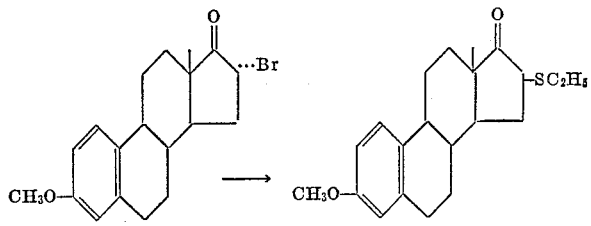

To a solution of 16α-bromoestrone 3-methyl ether [Johnson et al.: J. Am. Chem. Soc., vol. 79, p. 2005 (1957)] (728 mg.) in anhydrous acetone (28 ml.), there is added potassium ethylmercaptide (300 mg.) while stirring at room temperature (15 to 30° C.). After stirring for 40 minutes, water is added to the reaction mixture and then shaken with ether. The ether extract is washed with 5% sodium hydroxide and water in order, dried over potassium carbonate and evaporated to give a yellowish viscous substance (661 mg.). The substance is dissolved in ethanol, treated with activated carbon and condensed to separate crude crystals (237 mg.) melting at 120° C. The mother liquor is chromatographed on alumina and eluted with a mixture of petroleum ether and benzene (1:1) to give additional crude crystals (219 mg.). These crystals are combined together and recrystallized from methanol to give 16β-ethylthioestrone 3-methyl ether (430 mg.) as white plates melting at 125° C. $[\alpha]_D^{21}$ +109.2° (CHCl$_3$).

$\lambda_{max.}^{ethanol}$ mμ (ε): 221 (8,600), 278.5 (1,930), 287 (1,810), 322 (172). $\nu_{max.}^{Nujol}$ 1726 cm.$^{-1}$ Analysis.—Calcd. for C$_{21}$H$_{28}$O$_2$S: C, 73.21; H, 8.22; S, 9.31. Found: C, 72.84; H, 8.19; S, 9.34.

Example 2

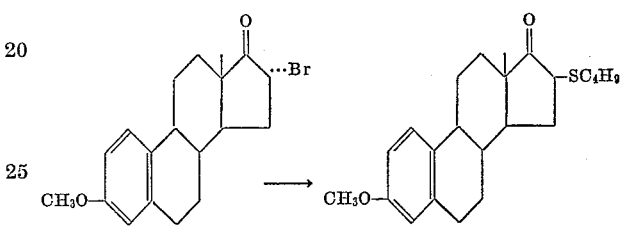

To a suspension of 16α-bromoestrone 3-methyl ether (2 g.) in anhydrous acetone (135 ml.), there is added potassium butylmercaptide (1.2 g.), and the resultant mixture is stirred for 2 hours at room temperature (15 to 30° C.). Water is added to the reaction mixture and then shaken with ether. The ether extract is washed with water, dried and evaporated to give the residue (2.28 g.). The residue is chromatographed on alumina (120 g.) and eluted with a mixture of petroleum ether and benzene (1:1). The eluate is evaporated and crystallized from methanol to give 16β-butylthioestrone 3-methyl ether (1.26 g.) as colorless prisms melting at 107.5 to 108.5° C. $[\alpha]_D^{24}$ +94.4° (CHCl$_3$).

$\lambda_{max.}^{ethanol}$ mμ (ε): 221.6 (9,490), 278 (2,190), 287 (2,020), 321 (190). $\nu_{max.}^{Nujol}$ 1729, 1610, 1503, 1256, 1236 cm.$^{-1}$ Analysis.—Calcd. for C$_{23}$H$_{32}$O$_2$S: C, 74.15; H, 8.66; S, 8.61. Found: C, 74.26; H, 8.62; S, 8.70.

Example 3

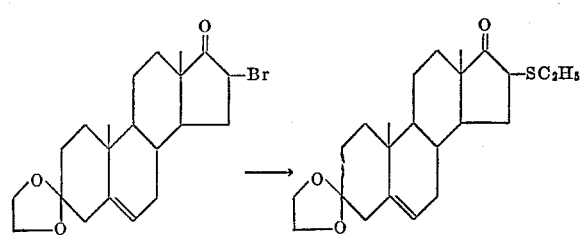

A mixture of 3,3-ethylenedioxy-16β-bromo-5(6)-androsten-17-one (1.000 g.), prepared by subjecting 16β-bromo-4-androstene-3,17-dione [Fajkos et al.: Chemical Abstracts, vol. 53, p. 4349 (1959)] to ketalation with ethylene glycol and p-toluenesulfonic acid in a per se conventional manner, and sodium ethylmercaptide (450 mg.) in acetone (20 ml.) is stirred for 3 hours at room temperature (15 to 30° C.). Water is added to the reaction mixture, and the precipitate is collected by filtration, washed with water and dried. The resultant substance is chromatographed on alumina (20 g.) and eluted with a mixture of petroleum ether and benzene (2:1). After recovery of the starting material (212 mg.), the subsequent eluate is evaporated and recrystallized from methanol to give 3,3 - ethylenedioxy - 16β - ethylthio - 5(6) - androsten-17-one (435 mg.) as scales melting at 164 to 166° C. $[\alpha]_D^{21}$ −5.9±2° (CHCl$_3$).

$\nu_{max}^{Nujol}$ 1733, 1670 cm.$^{-1}$

*Analysis.*—Calcd. for $C_{23}H_{34}O_3S$: C, 70.73; H, 8.77; S, 8.21. Found: C, 70.79; H, 8.76; S, 8.04.

Example 4

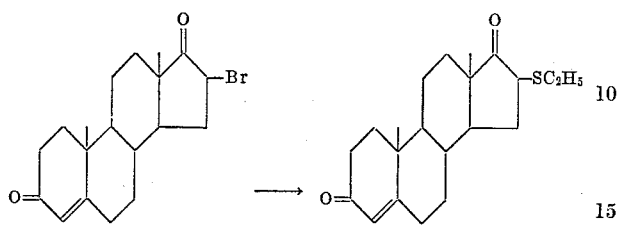

16β-bromo-4-androstene-3,17-dione is subjected to thio-etherification as in Example 3 to give 16β-ethylthio-4-androstene-3,17-dione as pillars melting at 153 to 155° C. (crystallized from methanol). $[\alpha]_D^{21}$ +115.8±2° (CHCl$_3$).

$\lambda_{max}^{ethanol}$ m$\mu$ ($\epsilon$): 241 (17,560). $\nu_{max}^{Nujol}$ 1736, 1662, 1616 cm.$^{-1}$

*Analysis.*—Calcd. for $C_{21}H_{30}O_2S$: C, 72.78; H, 8.73; S, 9.25. Found: C, 72.95; H, 8.85; S, 9.31.

Example 5

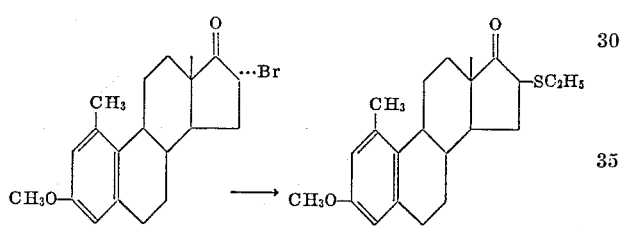

1-methyl-16α-bromoestrone 3-methyl ether (4 g.) is dissolved in acetone (120 ml.), and the freshly prepared sodium ethylmercaptide (1.8 g.) added thereto. The resultant mixture is stirred for 1 hour at room temperature (15 to 30° C.). Water is added to the reaction mixture and shaken with ether. The ether extract is washed with aqueous sodium carbonate and then water. Evaporating the ether, the residue is chromatographed on alumina and eluted with a mixture of petroleum ether and benzene (1:1) to give 1-methyl-16β-ethylthioestrone 3-methyl ether (3 g.) as a viscous substance.

$\nu_{max}^{chloroform}$ 1739, 1606, 1586 cm.$^{-1}$

The starting material of this example, 1-methyl-16α-bromoestrone 3-methyl ether, is prepared from testosterone propionate according to the following scheme:

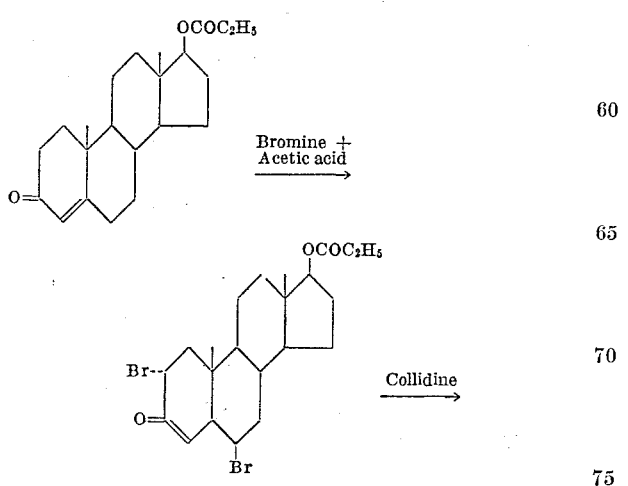

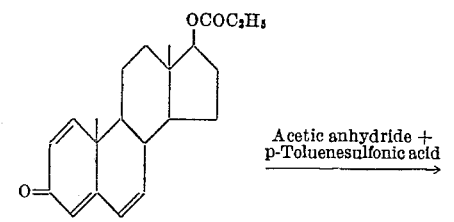

Example 6

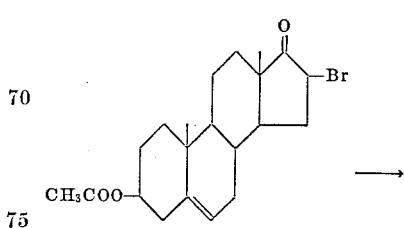

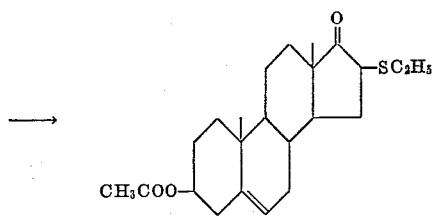

A mixture of 3β-hydroxy-16β-bromo-5(6)-androsten-17-one 3-acetate [Ellis et al.: J. Chem. Soc., p. 800 (1958)], (2.05 g.), potassium carbonate (485 mg.), ethylmercaptan (0.75 ml.) in acetone (20 ml.) is refluxed for 3 hours while stirring and then allowed to stand at room temperature (15 to 30° C.), overnight. Water is added to the reaction mixture and shaken with ether. The ether extract is washed with 5% sodium hydroxide and water in order, dried over potassium carbonate and evaporated. The residue is chromatographed on alumina (40 g.) and eluted with a mixture of petroleum ether and benzene to give crude crystals (904 mg.) melting at 115 to 120° C. The crude crystals are recrystallized from methanol to give 3β-hydroxy-16β-ethylthio-5(6)-androsten-17-one 3-acetate as pillars melting at 124 to 126° C.

$[\alpha]_D^{19} - 24.4 \pm 2°$ (CHCl$_3$). $\nu_{max}^{Nujol}$ 1738 (shoulder) 1728, 1243, 1036 cm.$^{-1}$

*Analysis.*—Calcd. for C$_{23}$H$_{34}$O$_3$S: C, 70.73; H, 8.77; S, 8.21. Found: C, 70.73; H, 8.85; S, 8.06.

Example 7

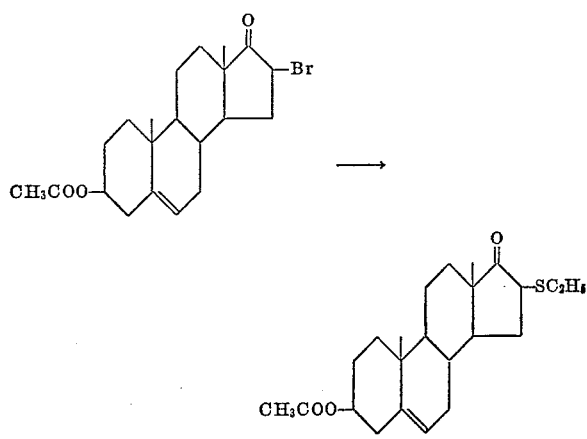

A mixture of 3β-hydroxy-16β-bromo-5(6)-androsten-17-one 3-acetate (1.000 g.) and sodium ethylmercaptide (411 mg.) in acetone (25 ml.) is stirred for 3 hours at room temperature (15 to 30° S.). Water is added to the reaction mixture and shaken with ether. The ether extract is washed with 5% sodium hydroxide and water in order, dried over potassium carbonate and evaporated. The residue is chromatographed on alumina and eluted with a mixture of petroleum ether and benzene. The eluted substance is crystallized from pentane to give 3β-hydroxy-16β-ethylthio-5(6)-androsten-17-one 3-acetate (560 mg.) as pillars melting at 124 to 126° C.

In the similar manner, there can be obtained other 16β-lower alkylthioestrone lower alkyl ether, 3,3-lower alkylene - dioxy - 16β - lower alkylthio - 5(6) - androsten-17-one, 16β-lower alkylthio-4-androstene-3,17-dione, 1-lower alkyl-16β-lower alkylthioestrone lower alkyl ether and 3β-hydroxy-16β-lower alkylthio-5(6)-androsten-17-one 3-lower alkanoate.

What is claimed is:

1. Process which comprises reacting 16-halogeno-17-oxo-steroid of the formula

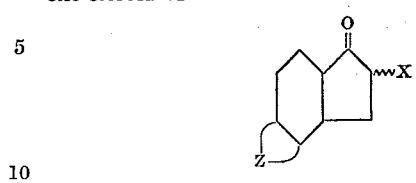

wherein X is a halogen selected from the group consisting of Cl, Br and I, and Z is a ring system selected from the group consisting of

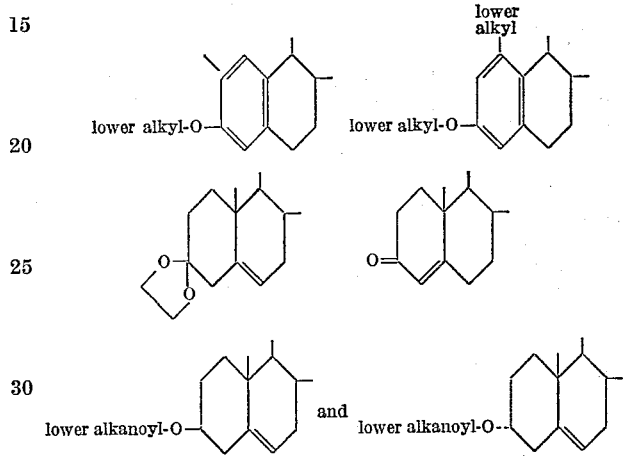

with metal lower alkylmercaptide to produce the corresponding 16β-lower alkylthio-17-oxo-steroid.

2. Process according to claim 1, wherein the metal lower alkyl mercaptide is alkali metal lower alkylmercaptide.
3. Process according to claim 1, wherein the reaction is carried out in an inert organic solvent.
4. Process according to claim 1, wherein the reaction is carried out at a temperature from room temperature to reflux temperature.
5. A steroid of the formula:

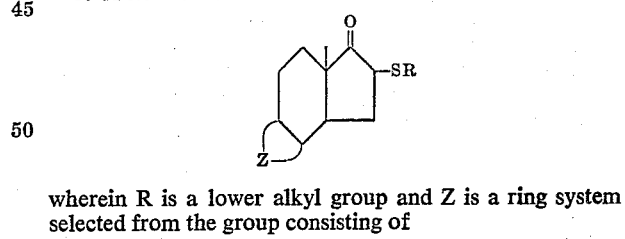

wherein R is a lower alkyl group and Z is a ring system selected from the group consisting of

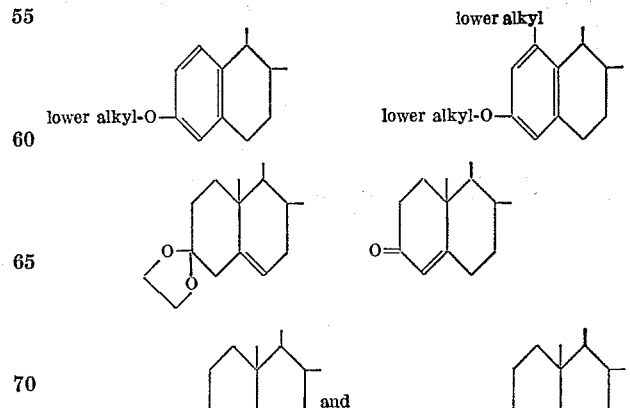

6. 16β-lower alkylthioestrone lower alkyl ether.
7. 16β-ethylthioestrone 3-methyl ether.
8. 16β-butylthioestrone 3-methyl ether.

9. 3,3-lower alkylenedioxy-16β-lower alkylthio-5(6)-androsten-17-one.

10. 3,3 - ethylenedioxy - 16β - ethylthio - 5(6) - androsten-17-one.

11. 16β-lower alkylthio-4-androstene-3,17-dione.

12. 16β-ethylthio-4-androstene-3,17-dione.

13. 1 - lower alkyl - 16β - lower alkylthioestrone lower alkyl ether.

14. 1-methyl-16β-ethylthioestrone 3-methyl ether.

15. 3β-hydroxy-16β-lower alkylthio-5(6)-androsten-17-one 3-lower alkanoate.

16. 3β - hydroxy - 16β - ethylthio - 5(6) - androsten-17-one 3-acetate.

17. 3,3-thylenedioxy - 16β - lower alkylthio - 5(6) - androsten-17-one.

References Cited

UNITED STATES PATENTS 2,837,464    6/1958    Nobile _____ 260—397.47

ELBERT L. ROBERTS, *Primary Examiner.*

L. GOTTS, *Examiner.*